(12) United States Patent
Dewa et al.

(10) Patent No.: US 7,365,821 B2
(45) Date of Patent: Apr. 29, 2008

(54) LIQUID CRYSTAL DISPLAY HAVING DUMMY BUMP CONNECTED TO DUMMY LEAD FOR HEAT REDUCTION

(75) Inventors: Shigekuni Dewa, Tokyo (JP); Seiichi Funakoshi, Kanagawa (JP); Masashi Yamada, Kanagawa (JP)

(73) Assignee: Sony Corporation (JP)

( * ) Notice: Subject to any disclaimer, the term of this patent is extended or adjusted under 35 U.S.C. 154(b) by 337 days.

(21) Appl. No.: 11/153,501

(22) Filed: Jun. 16, 2005

(65) Prior Publication Data

US 2006/0001821 A1 Jan. 5, 2006

(30) Foreign Application Priority Data

Jul. 2, 2004 (JP) ............................ P2004-196217
Jul. 2, 2004 (JP) ............................ P2004-196218
Jul. 5, 2004 (JP) ............................ P2004-197691

(51) Int. Cl.
*G02F 1/1333* (2006.01)

(52) U.S. Cl. ............................. 349/161; 349/5; 349/60; 349/150

(58) Field of Classification Search ............... 349/5–10, 349/161, 58–60, 150
See application file for complete search history.

(56) References Cited

U.S. PATENT DOCUMENTS 5,168,384 A * 12/1992 Genba ......................... 349/58
6,069,677 A * 5/2000 Kitai ........................... 349/111
6,791,521 B2 * 9/2004 Isami et al. .................... 345/89
7,023,504 B2 * 4/2006 Miyashita et al. ............. 349/58
7,093,960 B2 * 8/2006 Kojima et al. ............... 362/294

FOREIGN PATENT DOCUMENTS

JP  2003-332585  11/2003

* cited by examiner

*Primary Examiner*—Andrew Schechter
*Assistant Examiner*—John Heyman
(74) *Attorney, Agent, or Firm*—Rader Fishman & Grauer PLLC; Ronald P. Kananen

(57) ABSTRACT

A liquid crystal display for use in a LCD projector includes a liquid crystal display panel including a TFT substrate, a counter substrate, and liquid crystal interposed between the TFT substrate and the counter substrate; a flexible film substrate being electrically coupled to the liquid crystal display panel and having a plurality of leads including at least one dummy lead; and a driving IC for driving the liquid crystal display panel, the driving IC being disposed on the film substrate and having at least one dummy bump. The dummy bump is connected to the dummy lead, and the dummy lead has a heat releasing function.

10 Claims, 18 Drawing Sheets

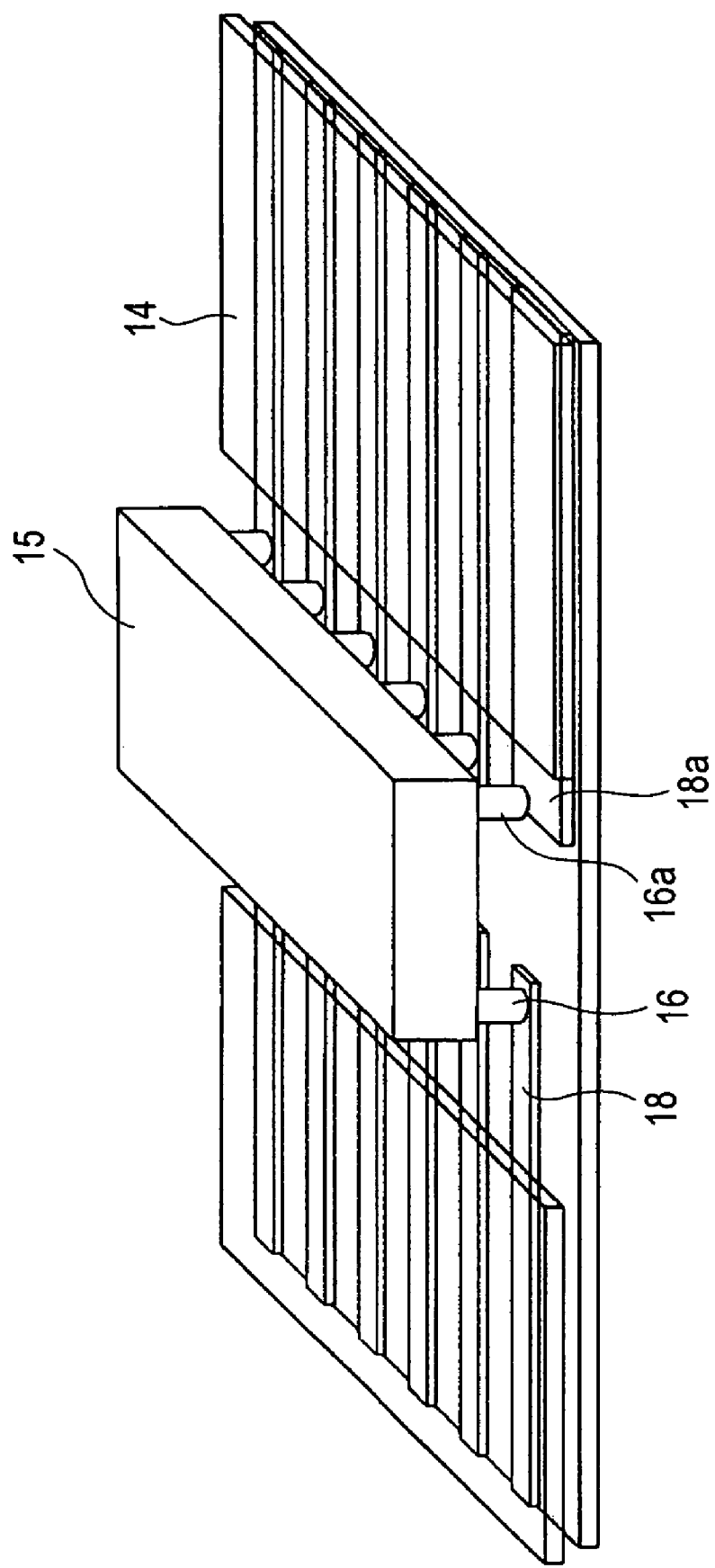

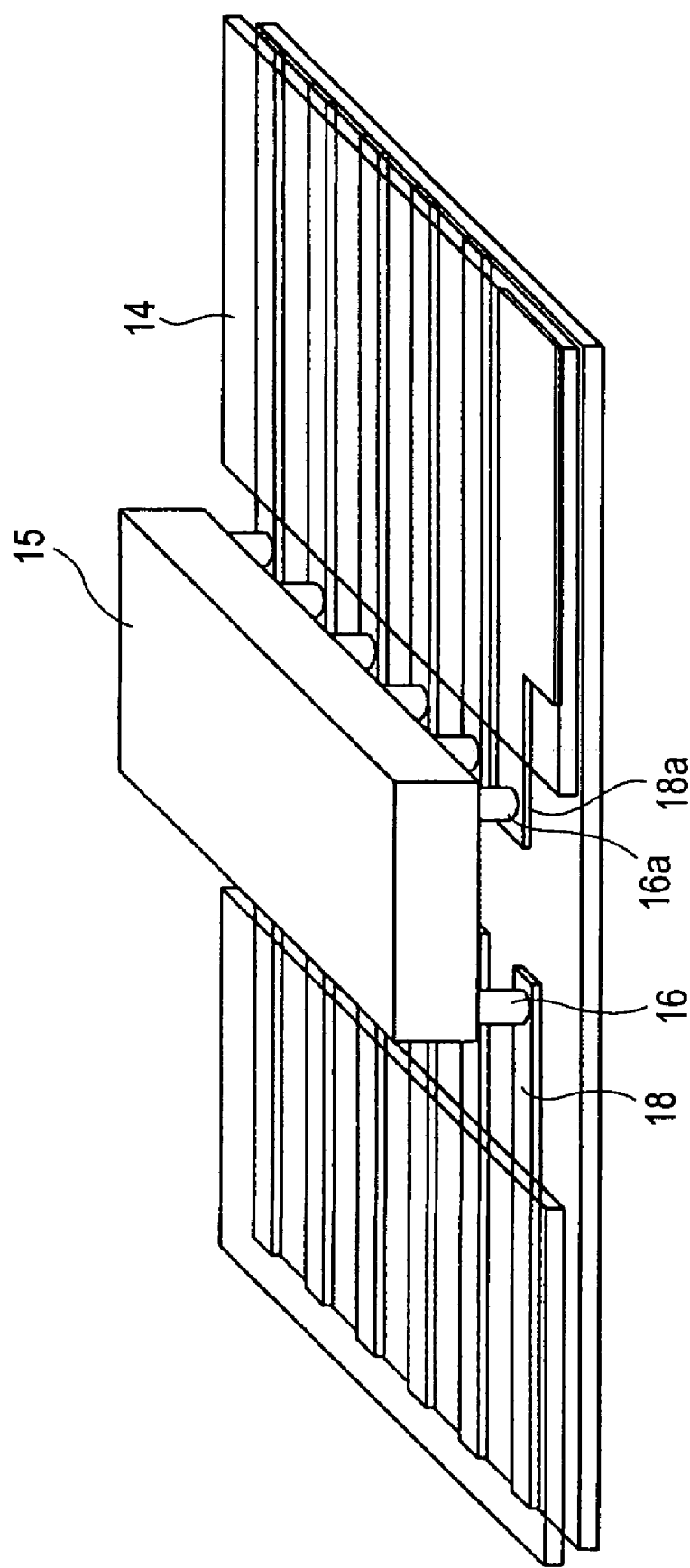

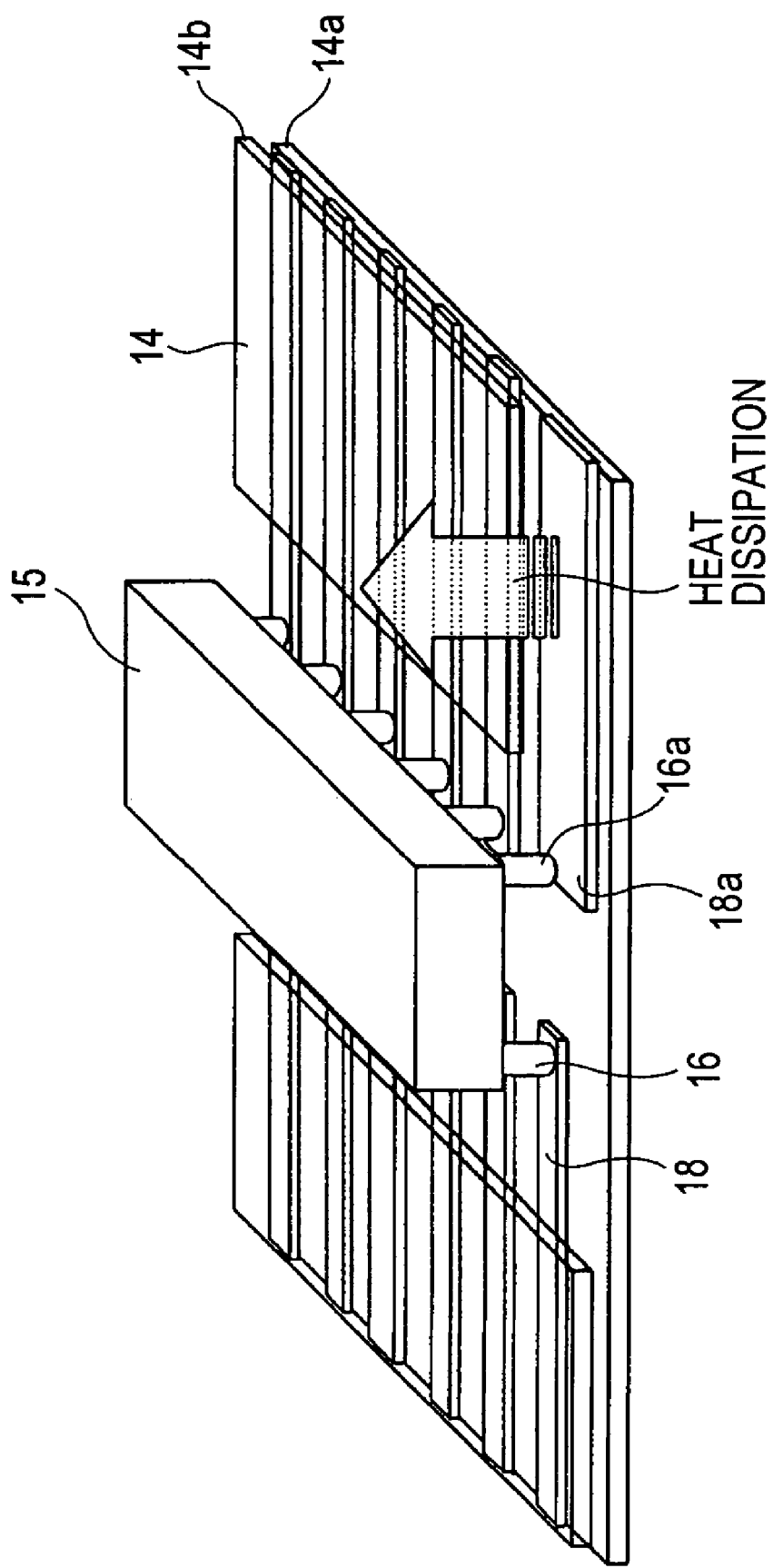

LIQUID CRYSTAL DISPLAY HAVING DUMMY BUMP CONNECTED TO DUMMY LEAD FOR HEAT REDUCTION

CROSS REFERENCES TO RELATED APPLICATIONS

The present invention contains subject matter related to Japanese Patent Application JP 2004-196217 filed in the Japanese Patent Office on Jul. 2, 2004, Japanese Patent Application JP 2004-196218 filed in the Japanese Patent Office on Jul. 2, 2004, and Japanese Patent Application JP 2004-197691 filed in the Japanese Patent Office on Jul. 5, 2004, the entire contents of which are incorporated herein by reference.

BACKGROUND OF THE INVENTION

1. Field of the Invention

The present invention relates to liquid crystal displays for use in liquid crystal display (LCD) projectors.

2. Description of the Related Art

LCD projectors that operate by selectively transmitting light from a light source using liquid crystal displays and then throwing the transmitted light onto a screen to deliver images on large-screens have gained popularity in recent years. The liquid crystal displays incorporated in these LCD projectors typically include internal driving circuits. These liquid crystal displays use polycrystalline silicon thin-film transistors (hereinafter, polysilicon TFTs), produced by high-temperature processes, instead of amorphous silicon films, since such polysilicon films have high electron mobility.

Demands for higher precision, higher aperture ratios, and lower cost have been increasingly placed on the liquid crystal displays for use in LCD projectors. In response to these needs, a proposal of external driving circuits has been made (for example, Japanese Unexamined Patent Application Publication No. 2003-332585). This proposal corresponds with trends of other liquid crystal devices in which external driving circuits are used instead of internal driving circuits. In detail, a driver IC, for driving a liquid crystal display panel, is provided separate from the liquid crystal display panel including effective pixels to thereby increase the effective pixel area of the liquid crystal display panel and to increase the number of the liquid crystal display panels that can be produced from one mother substrate. Furthermore, higher precision, higher aperture ratios, and lower cost can be achieved according to this structure.

SUMMARY OF THE INVENTION

In the LCD projectors, however, light having a high intensity of about 40,000,000 lux in terms of white light is incident on the liquid crystal display panels of the projectors. The incidence of such intense light increases the temperature around the liquid crystal display panels, in particular, the temperature of the driver ICs. Moreover, the driver ICs generate heat by operation (energization). The increase in temperature of the driver ICs may result in driver malfunction, degraded image quality resulting from the malfunction and the temperature increase, and low reliability of the liquid crystal displays.

In order to comply with the needs of higher precision, higher aperture ratios, and lower cost, it is desirable to provide a liquid crystal display, which has an external driving IC separate from the liquid crystal display panel and which can reduce malfunction and prevent a decrease in image quality and reliability by effectively controlling the temperature increase in the driving IC.

An embodiment of the present invention provides a liquid crystal display for use in a LCD projector for projecting an enlarged image and for optically modulating light emitted from a light source of the LCD projector. The liquid crystal display includes a liquid crystal display panel including a TFT substrate, a counter substrate, and liquid crystal interposed between the TFT substrate and the counter substrate; a flexible film substrate being electrically coupled to the liquid crystal display panel and having a plurality of leads including at least one dummy lead; and a driving IC for driving the liquid crystal display panel, the driving IC being disposed on the film substrate and having at least one dummy bump. The dummy bump is connected to the dummy lead, and the dummy lead has a heat releasing function.

Here, the term "dummy bump" refers to a bump not contributing to the driving of the liquid crystal display panel. The number of dummy bumps may be any. The term "dummy lead" refers to a lead not necessary for driving of the liquid crystal display panel. The phrase "having a heat releasing function" means that the component has heat conductivity and is capable of transferring the heat in the dummy lead to the ambient air or another component connected thereto. According to the liquid crystal display described above, the heat generated in the driving IC is transferred to the dummy lead through the dummy bump and is released from the dummy lead. Thus, the temperature increase in the driving IC can be suppressed.

Another embodiment of the present invention provides another liquid crystal display for use in a LCD projector for projecting an enlarged image and for optically modulating light emitted from a light source of the LCD projector. The liquid crystal display includes a liquid crystal display panel including a TFT substrate, a counter substrate, and liquid crystal interposed between the TFT substrate and the counter substrate; a support including a frame for supporting the liquid crystal display panel; a flexible film substrate being electrically coupled to the liquid crystal display panel; and a driving IC for driving the liquid crystal display panel. The driving IC is disposed on the flexible film substrate, and the position of the driving IC is distant from an outer edge of the support in an outward direction.

With this structure, the driving IC is exposed outside the support and not covered with the support. As a consequence, the heat generated in the driving IC can be easily released to the outer side of the support, i.e., to the exterior of the liquid crystal display. Moreover, it becomes possible to position the driving IC on the passage of the cooling air. Thus, the driving IC can be efficiently cooled, and the temperature increase in the driving IC can be effectively suppressed.

Yet another embodiment of the present invention provides another liquid crystal display for use in a LCD projector for projecting an enlarged image and for optically modulating light emitted from a light source of the LCD projector. The liquid crystal display includes a liquid crystal display panel including a TFT substrate, a counter substrate, and liquid crystal interposed between the TFT substrate and the counter substrate; a driving IC for driving the liquid crystal display panel, the driving IC being disposed on one of the substrates; and light-shielding means for shielding light entering the driving IC.

With this structure, the light-shielding means blocks the light from the light source of the LCD projector and prevents light from the light source from directly entering the driving IC. Thus, the temperature increase and the generation of carriers are prevented in the driving IC.

BRIEF DESCRIPTION OF THE DRAWINGS

FIG. 5 is a partial perspective view of an example of the liquid crystal display of the first embodiment;

FIG. 6 is a partial perspective view of an example of a liquid crystal display of the first embodiment with a partial modification;

FIG. 7 is a partial perspective view of an example of a liquid crystal display of the first embodiment with a partial modification;

DESCRIPTION OF THE PREFERRED EMBODIMENTS

Figure 1:
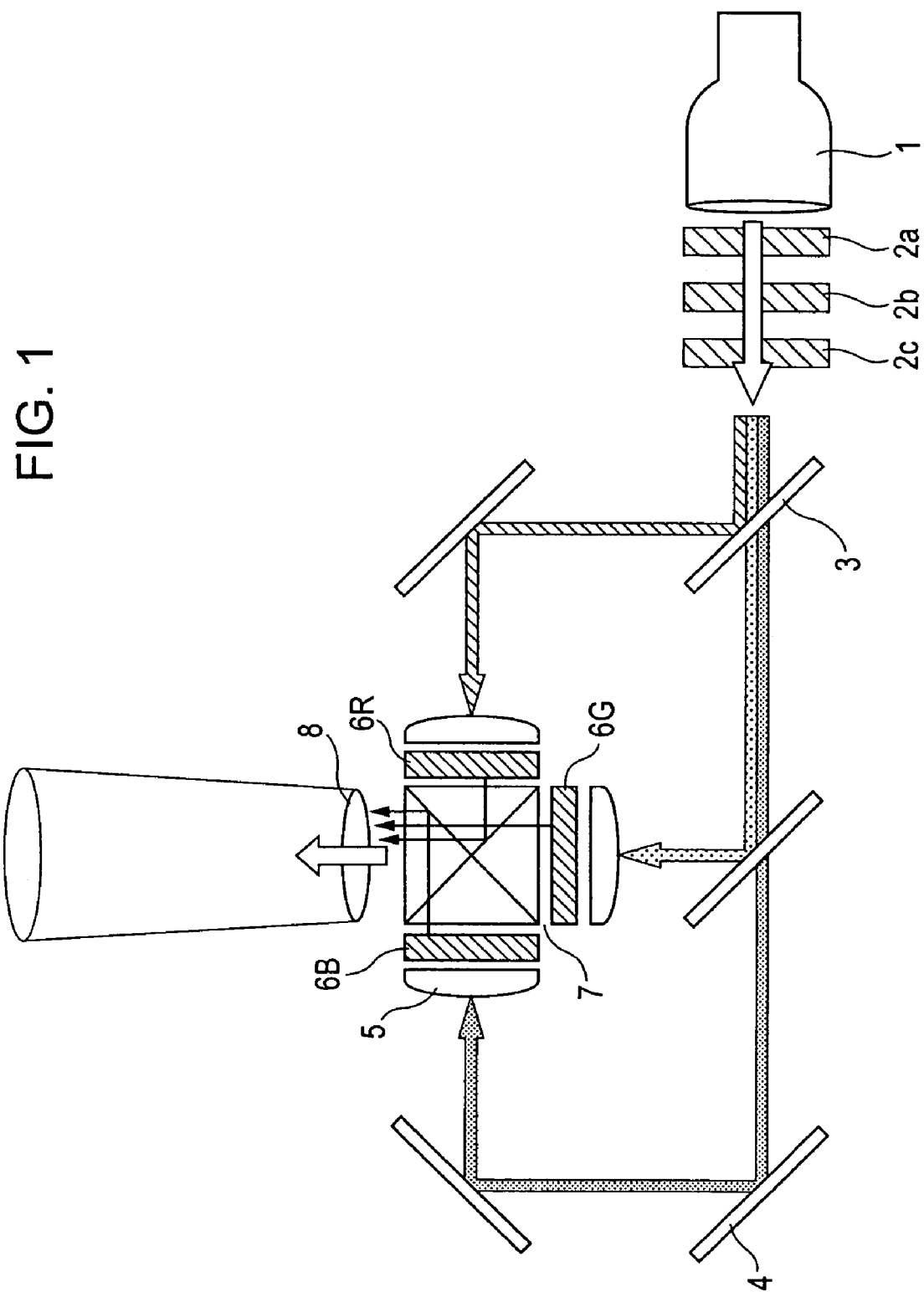
FIG. 1 is a schematic diagram showing a three-panel LCD projector.

The preferred embodiments of the present invention will be described below with reference to the drawings. In the description below, the identical components are represented by the same reference numerals.

First Embodiment

A LCD projector incorporating liquid crystal displays is first described. A three-panel liquid crystal display (LCD) projector that includes three liquid crystal displays respectively having panels of red, green, and blue is widely known. FIG. 1 is a diagram showing the configuration of a three-panel LCD projector.

Referring to FIG. 1, light emitted from a light source 1 passes through a filter 2a that cuts infrared and UV rays, a fly-eye lens 2b, and a PS splitter/synthesizer for converting unpolarized light to polarized light, and is split into R, G, and B light beams with dichroic mirrors 3 that each reflect only a light beam in a particular wavelength region. The RGB light beams respectively enter liquid crystal displays 6R, 6G, and 6B via total reflection mirrors 4 and a condenser lens 5 where necessary, and modulated according to image signals in the liquid crystal displays 6R, 6G, and 6B. The modulated light beams are combined with a dichroic prism 7 and enlarged with a projection lens 8 to project an enlarged color image onto a screen.

The liquid crystal displays 6R, 6G, and 6B will now be described with reference to FIGS. 2 to 7 showing various examples of liquid crystal displays of this embodiment.

Figure 2:
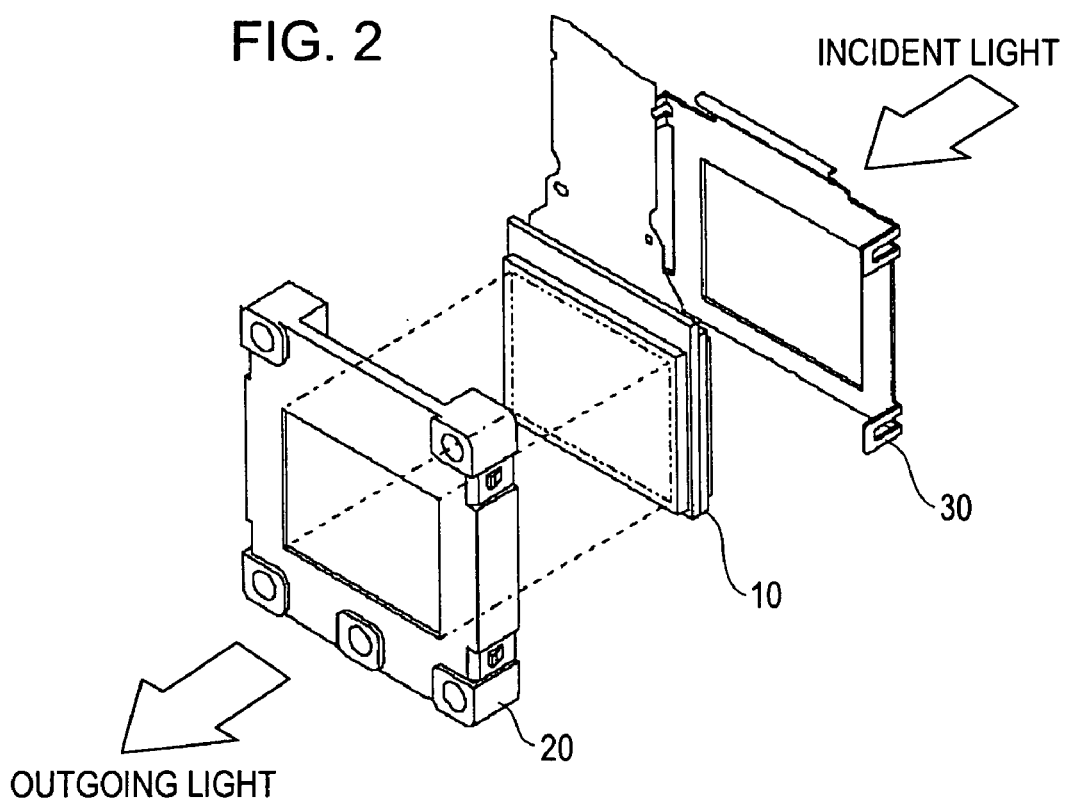
FIG. 2 is an exploded perspective view of a liquid crystal display of a first embodiment.
Figure 3:
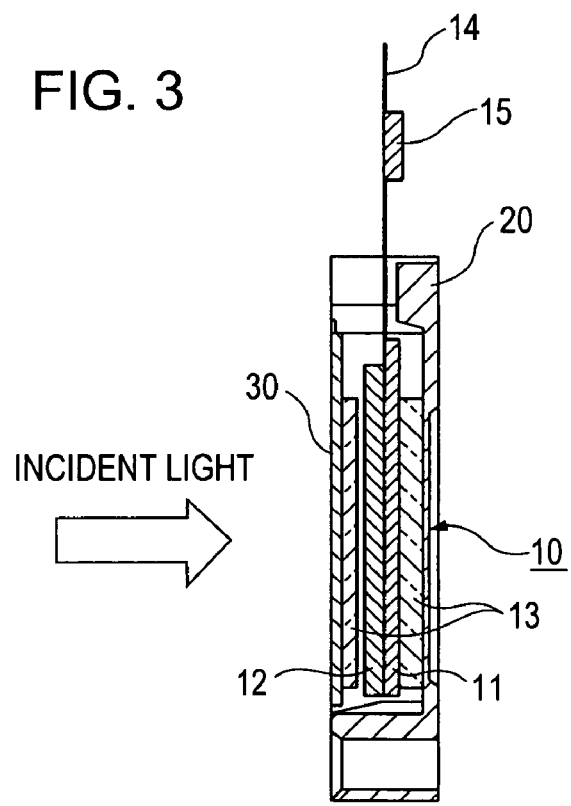
FIG. 3 is a diagram showing an example of liquid crystal display according to the first embodiment.

As shown in FIGS. 2 and 3, the liquid crystal display includes a liquid crystal display panel 10, a frame 20, and a light-shielding panel 30. The frame 20 is disposed at the outgoing-light-side of the liquid crystal display panel 10 and provides support for the liquid crystal display panel 10. The frame 20 may be composed of a metal material, such as aluminum magnesium or stainless steel, having high thermal conductivity, or a resin material having high thermal conductivity. The light-shielding panel 30 is disposed at the incident-light-side of the liquid crystal display panel 10 to prevent light from entering the region other than the effective pixel region. The light-shielding panel 30 may be a metal or resin plate with high thermal conductivity, having an opening that corresponds to the effective pixel region. Alternatively, the light may be incident in the opposite direction.

The liquid crystal display panel 10 includes a TFT substrate 11, a counter substrate 12, and liquid crystal (not shown) interposed between the TFT substrate 11 and the counter substrate 12. The TFT substrate 11 has TFTs, which serve as pixel electrodes constituting pixels, arranged in a matrix. The counter substrate 12 has a counter or common electrode. According to this structure, liquid crystal directors orient in the same direction by the application of voltage between the opposing electrodes of the liquid crystal display panel 10, thereby generating uniaxial birefringence anisotropy. As a result, the amount of transmitted light can be controlled, and light from the light source 1 can be optically modulated based on the image signals. At the incident light-side and the outgoing light-side of the liquid crystal display panel 10, two cover glasses 13 are respectively provided to protect the TFT substrate 11 and the counter substrate 12.

In order to meet the needs of higher precision, higher aperture ratios, and lower cost, the liquid crystal display panel 10 does not include a driving circuit for applying voltage to the electrodes on the TFT substrate 11 and the counter substrate 12 to drive the liquid crystal display panel 10. Instead, a flexible film substrate 14 electrically coupled to the respective electrodes on the TFT substrate 11 and the counter substrate 12 is attached to the liquid crystal display panel 10, and a driving IC 15, for driving the liquid crystal display panel 10, is disposed on the flexible film substrate 14. The structures of the flexible film substrate 14 and the driving IC 15 may be any, and the detailed description therefor is omitted since they are already well known in the related art.

The structure of the liquid crystal display shown in FIG. 3, including the liquid crystal display panel 10 and the external driving IC 15 provided on the flexible film substrate 14, is called a "chip-on-film" (COF) structure. With the COF structure, the effective pixel area in the liquid crystal display panel 10 can be increased and the number of the liquid crystal display panels 10 produced from a mother substrate can be easily increased since the driving IC 15 is provided separate from the liquid crystal display panel 10. Thus, higher precision, higher aperture ratios, and low cost can be realized. The driving IC 15 disposed on the flexible film substrate 14 contributes to reducing the size of the substrates 11 to 13 of the liquid crystal display panel 10 and offers greater flexibility to layout designing.

The features of the flexible film substrate 14 and the driving IC 15 will now be described in detail.

Figure 4A:
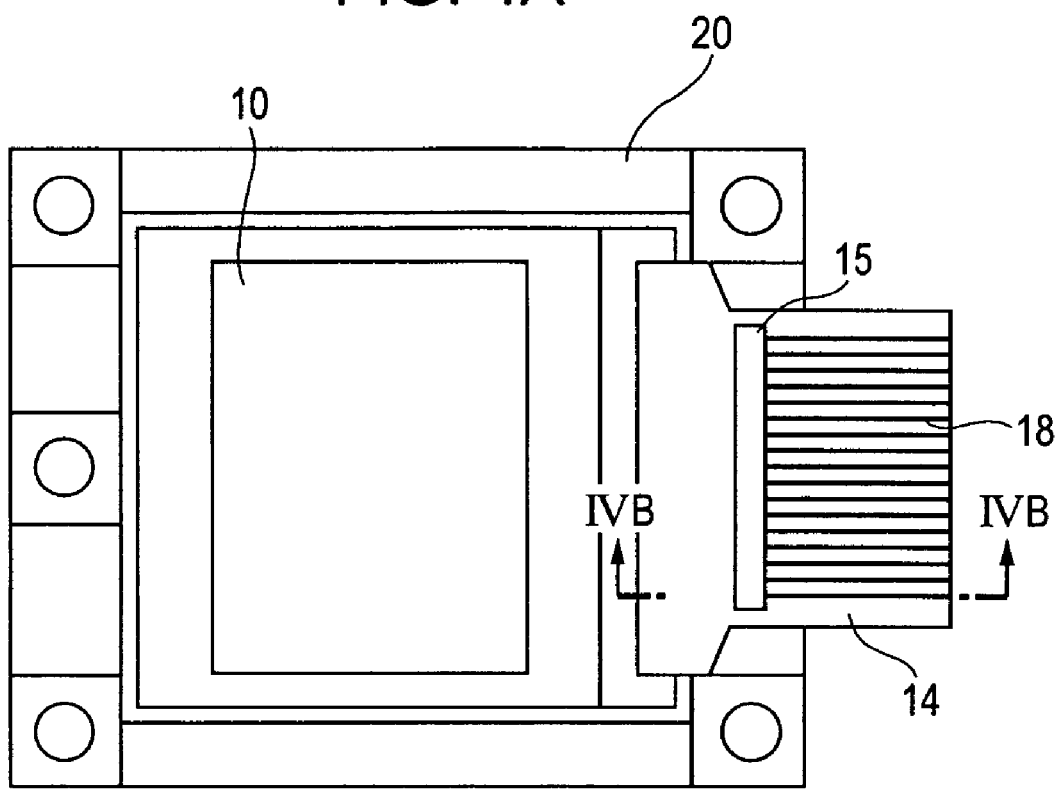
FIG. 4A is a diagram showing an example of the liquid crystal display of the first embodiment.
Figure 4B:
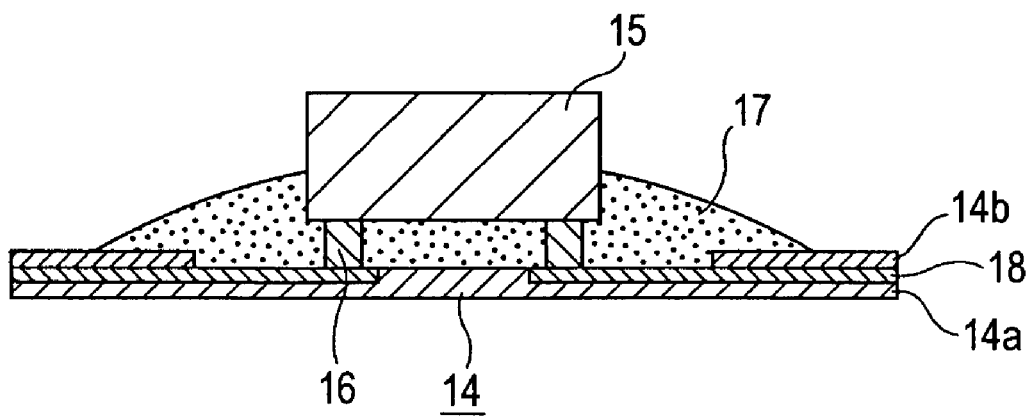
FIG. 4B is a cross-sectional partial view taken along line IVB-IVB in FIG. 4A.

Referring to FIGS. 4A and 4B, the driving IC 15 is mounted onto the flexible film substrate 14 with a plurality of bumps 16 by a flip-chip technique, and the connecting part is embedded in an underfill 17, e.g., a non-conductive paste, an anisotropic conductive film, or an anisotropic conductive paste. For example, as shown in FIG. 5, at least one of the bumps 16 is a dummy bump 16a. The term "dummy bump" refers to a bump not contributing to the driving of the liquid crystal display panel 10 by the driving IC 15, i.e., a bump that does not need to be electrically connected to the driving IC 15. The number of dummy bumps 16a may be any.

The flexible film substrate 14, onto which the driving IC 15 is formed, includes a base film 14a, a cover film 14b, and a plurality of leads 18 interposed between the base film 14a and the cover film 14b. The leads 18 are arranged parallel to each other at a pitch corresponding to the pitch between the bumps 16 of the driving IC 15. At least one of the leads 18 is a dummy lead 18a, and the dummy lead 18a connects to the dummy bump 16a of the driving IC 15. The term "dummy lead" refers to a lead not necessary for driving of the liquid crystal display panel as with the dummy bump. The dummy lead has a heat releasing function. Here, "heat releasing function" means that the dummy lead 18a has thermal conductivity and a capability to transfer heat in the dummy lead 18a to ambient air of the dummy lead 18a or to a component (e.g., to a circuit substrate connected to the flexible film substrate 14) connected to the dummy lead 18a. As with the dummy bump 16a, the number of the dummy leads 18a may be any. The number of the dummy leads 18a may not be the same as the number of the dummy bump 16a. A plurality of the dummy bumps 16a may be connected to one dummy lead 18a.

In this liquid crystal display having the above-described configuration, heat generated in the driving IC 15 is transferred to the dummy lead 18a via the dummy bump 16a and is released from the dummy lead 18a. It is a widespread practice to provide a dummy bump 16a to mount the driving IC 15 on a substrate in a balanced fashion. In this embodiment, the dummy bump 16a is connected to the dummy lead 18a so that the dummy lead 18a can be used to release heat generated from the driving IC 15.

Thus, a LCD projector equipped with this liquid crystal display having a COF structure can meet the demands for higher precision, higher aperture ratios, low costs, and the like, and rarely suffers from malfunction resulting from a temperature increase since the heat dissipation from the dummy lead 18a suppresses a temperature increase in the driving IC 15. Moreover, this structure prevents inappropriate optical modulation in the liquid crystal display panel 10 by the malfunction, i.e., the degradation in the quality of the image displayed. Furthermore, the degradation in image quality resulting from heat transferred from the driving IC 15 to the liquid crystal display panel 10 can be reduced. According to the liquid crystal display described herein, the reliability of the driving IC 15, i.e., the driving circuit of the liquid crystal display panel 10, can be improved as well as the reliability of the liquid crystal display. Since no special elements are necessary, higher reliability can be achieved without increasing the cost.

In the flexible film substrate 14, the dummy lead 18a is preferably at an end of the row of the leads 18 on the flexible film substrate 14. Since the dummy bump 16a of the driving IC 15 is frequently located at an end of the driving IC 15, such an arrangement of the dummy lead 18a increases the flexibility of designing the shape of the dummy lead 18a.

To be more specific, the line width and the area of the dummy lead 18a can be increased compared to those of the other leads 18 if the dummy lead 18a is positioned at the end of the row of the leads 18, as shown in FIG. 5. The dummy lead 18a having this shape can satisfactorily release heat and is thus suitable for releasing heat from the driving IC 15.

Another example of the arrangement is shown in FIG. 6. In this example, the dummy lead 18a has a portion having a line width equal to that of the other leads 18 and a portion having a line width larger than that of the other leads 18, thereby having an increased average line width. Since the average line width of the dummy lead 18a is increased, heat can be released more effectively and the arrangement of the flexible film substrate 14, layouts of the leads, positions of the bumps of the driving IC 15, and the like can be designed with greater flexibility.

Another way of increasing the heat dissipation from the dummy lead 18a is to not cover the dummy lead 18a with the cover film 14b. For example, as shown in FIG. 7, only the leads 18, but not the dummy lead 18a, are covered with the cover film 14b. Since the dummy lead 18a is exposed, heat can be released more efficiently. It is also possible to provide cooling air to the exposed dummy lead 18a from a blower fan to achieve a higher heat dissipation effect. Thus, the dummy lead 18a not covered with the cover film 14b is more suitable for releasing heat from the driving IC 15. This arrangement is easily realized by positioning the dummy lead 18a at the end of the row of the leads 18.

Other examples of the liquid crystal display will now be described. FIGS. 8A to 9B are cross-sectional partial views of liquid crystal displays.

Figure 8A:
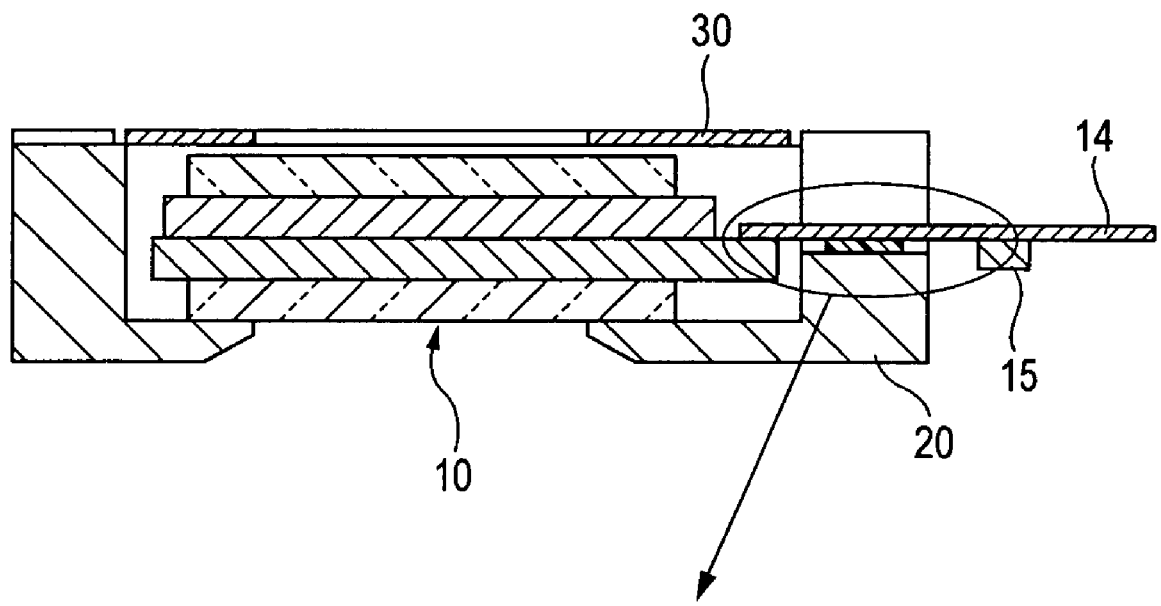
FIG. 8A is a cross-sectional view of an example of the liquid crystal display according to the first embodiment.
Figure 8B:
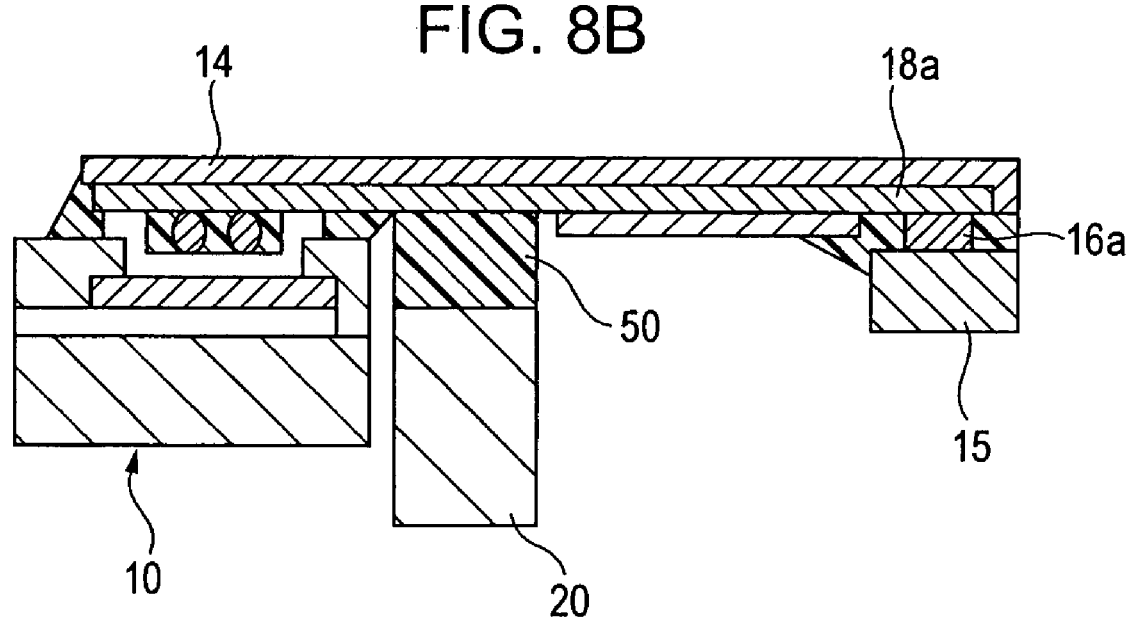
FIG. 8B is an enlarged partial cross-sectional view of the example shown in FIG. 8A.

The liquid crystal display shown in FIGS. 8A and 8B has the frame 20, which supports the liquid crystal display panel 10, in contact with the dummy lead 18a through a heat conductive resin 50. In detail, the portion of the flexible film substrate 14 corresponding to the frame 20 is not covered with the cover film 14b, and the dummy lead 18a in this uncovered portion comes into contact with the frame 20 via the heat conductive resin 50.

Figure 9A:
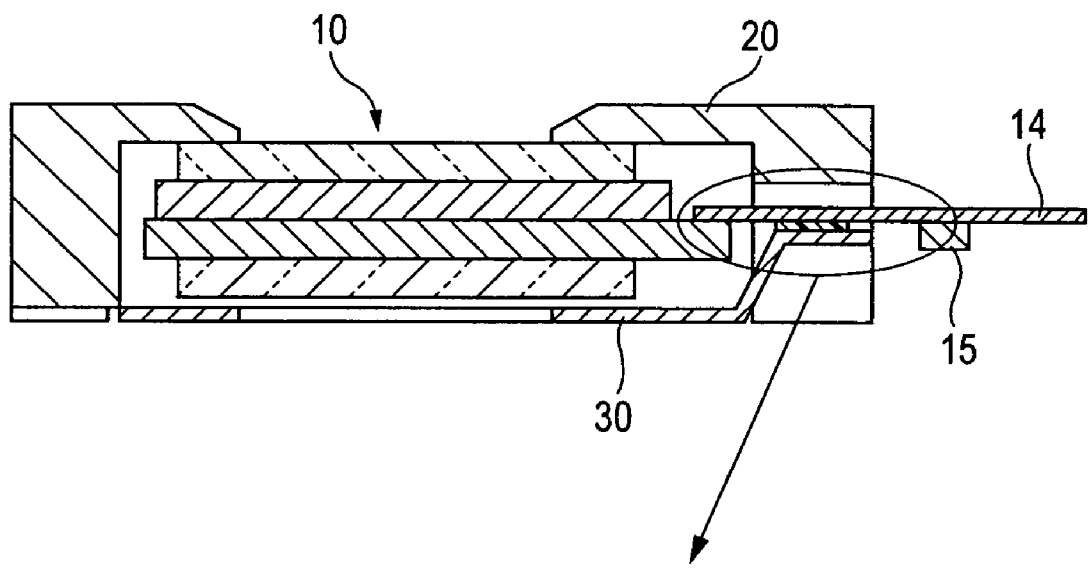
FIG. 9A is a cross-sectional view of an example of the liquid crystal display according to the first embodiment.
Figure 9B:
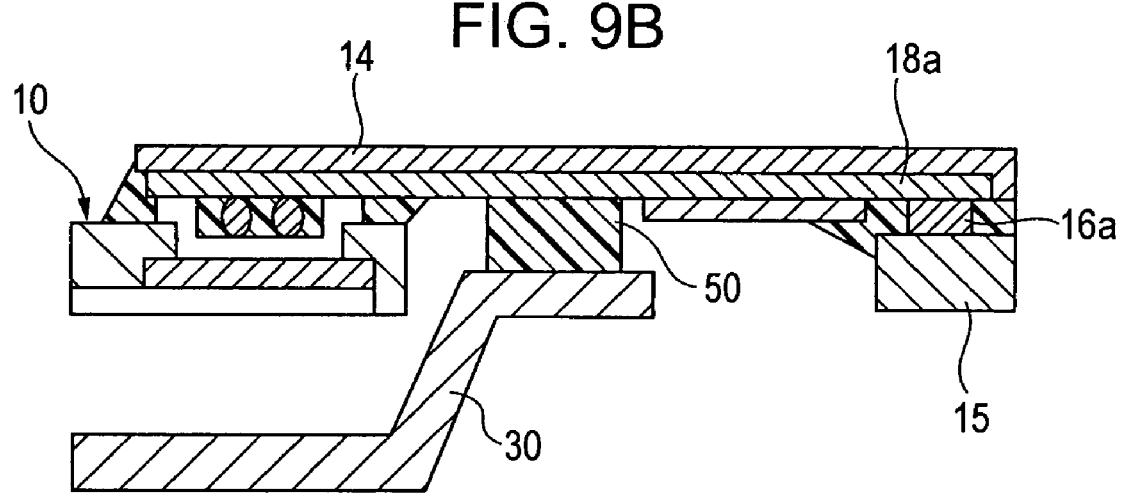
FIG. 9B is an enlarged partial cross-sectional view of the example shown in FIG. 8A.

The liquid crystal display shown in FIGS. 9A and 9B has the light-shielding panel 30, which shields light entering to regions other than the effective pixel region of the liquid crystal display panel 10, in contact with the dummy lead 18a through the heat conductive resin 50. In detail, the portion of the flexible film substrate 14 corresponding to the peripheral region of the light-shielding panel 30 is not covered with the cover film 14b, and the dummy lead 18a in this uncovered portion comes into contact with the dummy lead 18a via the heat conductive resin 50.

According to the structures shown in FIGS. 8A to 9B, the heat generated in the driving IC 15 can be transmitted to either the frame 20 or the light-shielding panel 30 via the dummy bump 16a and the dummy lead 18a. Thus, in addition to the dummy lead 18a, the frame 20 and the light-shielding panel 30 can also be used to release heat generated in the driving IC 15. Thus, the temperature increase of the driving IC 15 can be suppressed, and the malfunction of the driving IC 15 can be more reliably prevented.

Preferably, the heat conductive resin 50 is provided between the dummy lead 18a and the frame 20 and between the dummy lead 18a and the light-shielding panel 30 to transmit heat from the driving IC 15 via the frame 20 and the light-shielding panel 30. The heat conductive resin 50 is elastic and can thus absorb the difference in linear expansion coefficient between the flexible film substrate 14 and the frame 20 and between the flexible film substrate 14 and the light-shielding panel 30, in case the flexible film substrate 14, the frame 20, and the light-shielding panel 30 have different linear expansion coefficients. Thus, separation of the components can be prevented, and the heat generated in the driving IC 15 can be reliably transmitted to the frame 20 and the light-shielding panel 30. Examples of the heat conductive resin 50 include a heat-conducting sheet based on an acrylic rubber or ethylene-propylene rubber (e.g., TM Sheet EP produced by F-CO Co., Ltd.) and an insulating resin material having a high heat conductivity (e.g., CN-733 produced by MERECO).

Second Embodiment

Figure 10:
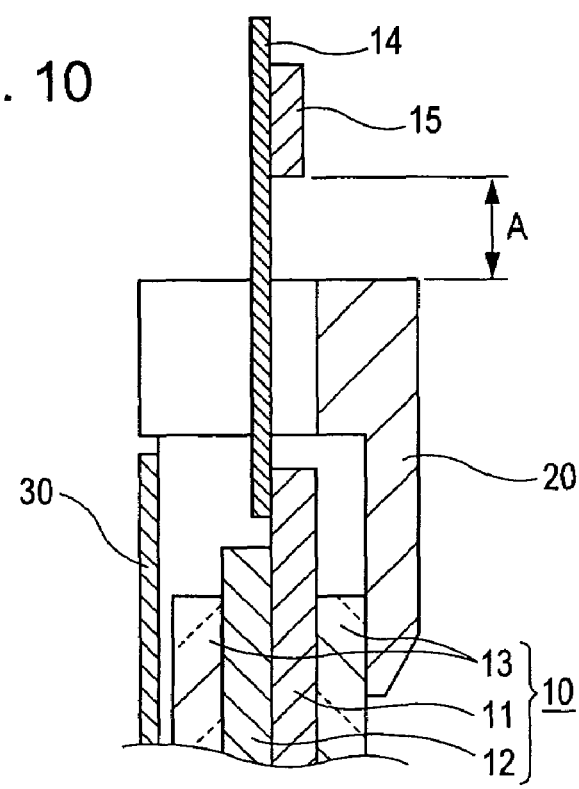
FIG. 10 is a partial sectional side view of an example of a liquid crystal display according to a second embodiment.

A liquid crystal display according to a second embodiment will now be described. The liquid crystal display of the second embodiment is shown in FIG. 10. The driving IC 15 is located distant from the outer edge of the support of the liquid crystal display panel 10, by a distance A in the outward direction.

Figure 11:
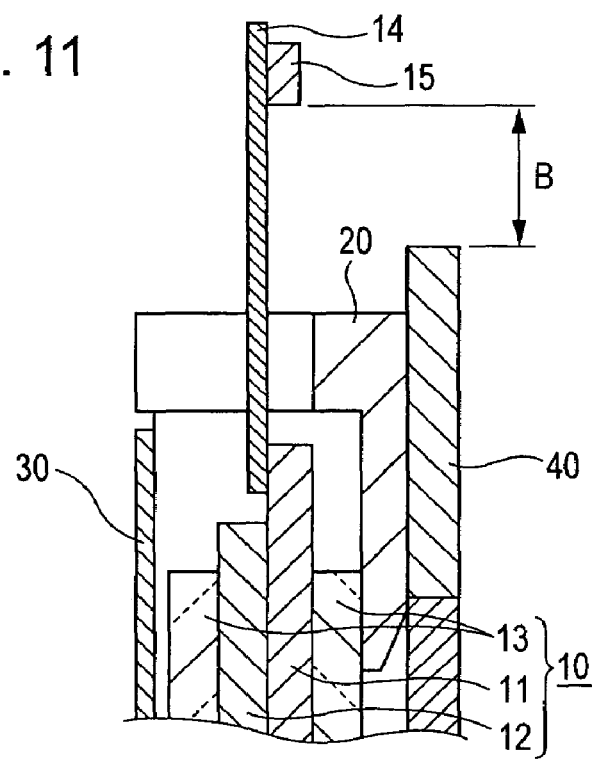
FIG. 11 is a partial sectional view of an example of a liquid crystal display according to the second embodiment with a partial modification.

The term "support" here refers to a component that supports the liquid crystal display panel 10. In particular, the frame 20 and the light-shielding panel 30 may each function as a support. Referring to FIG. 11, when the frame 20 is attached to a mounting board 40 so that the liquid crystal display can be attached to a dichroic prism (not shown), the mounting board 40 also function as a support. In this example, the driving IC 15 is located distant from the outer edge of the conductive pattern 40 by a distance B in the outward direction.

Figure 12A:
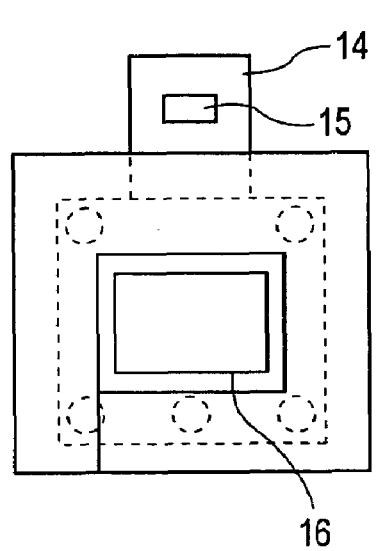
FIGS. 12A and 12B are perspective diagrams of examples of the liquid crystal display according to the second embodiment with partial modifications.
Figure 12B:
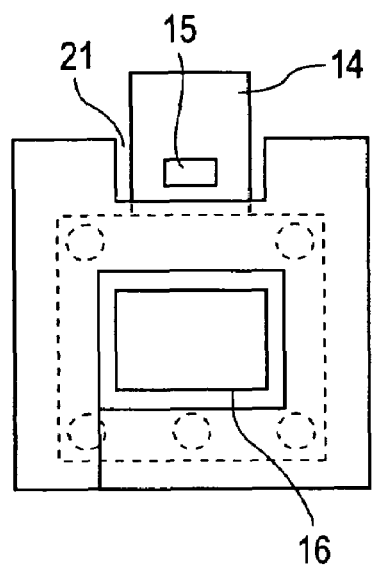

The phrase "distant from the outer edge of the support in the outward direction" means that the component is outside the region defined by the outline (outer shape in a plan view) of the support viewed in the direction of light incident on the liquid crystal display. In other words, as shown in FIG. 12A, the component is at the side remote from an effective pixel region 16 with reference to the outline of the support. The outline of the support is not limited to a rectangular shape shown in FIG. 12A. The outline may have a cutout portion 21, as shown in FIG. 12B. In such a case, a position inside the cutout portion 21 is also "distant from the outer edge of the support in the outward direction".

When the driving IC 15 is located distant from the outer edge of the support in the outward direction, the driving IC 15 is exposed and is not covered with the support such as frame 20 or the light-shielding panel 30. Thus, the heat generated in the driving IC 15 can easily be released.

Figure 13:
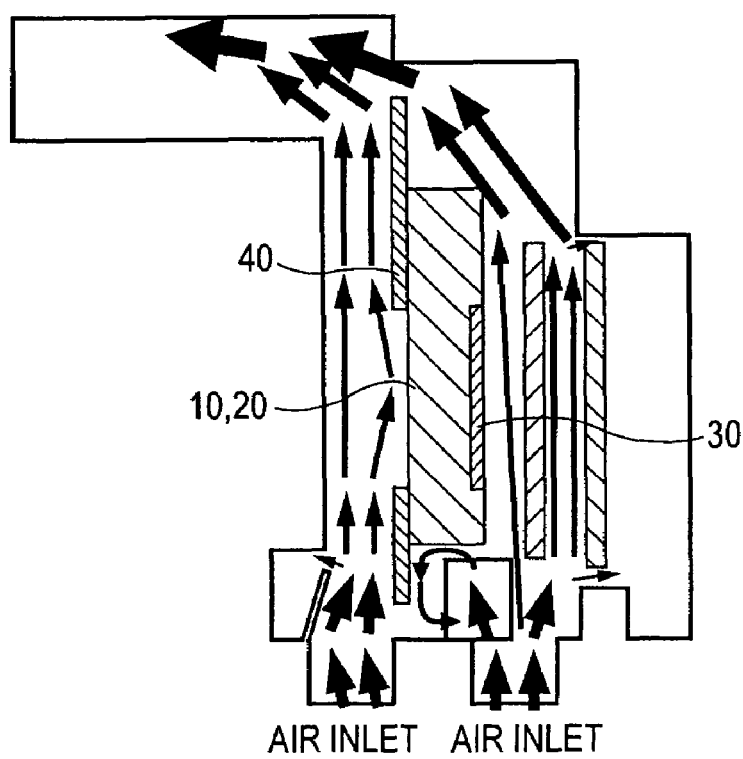
FIG. 13 is a schematic diagram showing an example of the liquid crystal display according to the second embodiment and airflow around the liquid crystal display.

Moreover, it also becomes possible to cool the driving IC 15 itself. A typical LCD projector is equipped with a blower fan and thus air flows around the liquid crystal display, as shown in FIG. 13. The driving IC 15 distant from the outer edge of the support is located on the air passage; hence, it is possible to cool the driving IC 15 with the air from the fan.

According to the liquid crystal display described above, heat can be easily released from the driving IC 15, and the driving IC 15 itself can be cooled. Thus, the temperature increase in the driving IC 15 can be suppressed. A LCD projector equipped with this liquid crystal display having a COF structure can meet the demands for higher precision, higher aperture ratios, low costs, and the like, and rarely suffers from malfunction of the driving IC 15 resulting from increased temperature. Moreover, this structure prevents inappropriate optical modulation in the liquid crystal display panel 10 by malfunction, i.e., the degradation in the quality of the image displayed. Furthermore, the degradation in image quality resulting from heat transferred from the driving IC 15 to the liquid crystal display panel 10 can be reduced. According to the liquid crystal display described herein, the reliability of the driving IC 15, i.e., the driving circuit of the liquid crystal display panel 10, can be improved as well as the reliability of the liquid crystal display. Since no special elements are necessary, higher reliability can be achieved without increasing the cost.

The driving IC 15 is preferably disposed at the outgoing light-side of the flexible film substrate 14 so that light is not directly incident on the driving IC 15. This is because, compared to a case where the driving IC 15 is disposed at the incident light-side of the flexible film substrate 14, the possibility of light (diffracted light and the like) entering the driving IC 15 can be decreased. When the light incident on the driving IC 15 is decreased, the temperature of the driving IC 15 can be prevented from increasing and malfunction of the TFTs caused by carriers generated by the incident light can be prevented.

Figure 14:
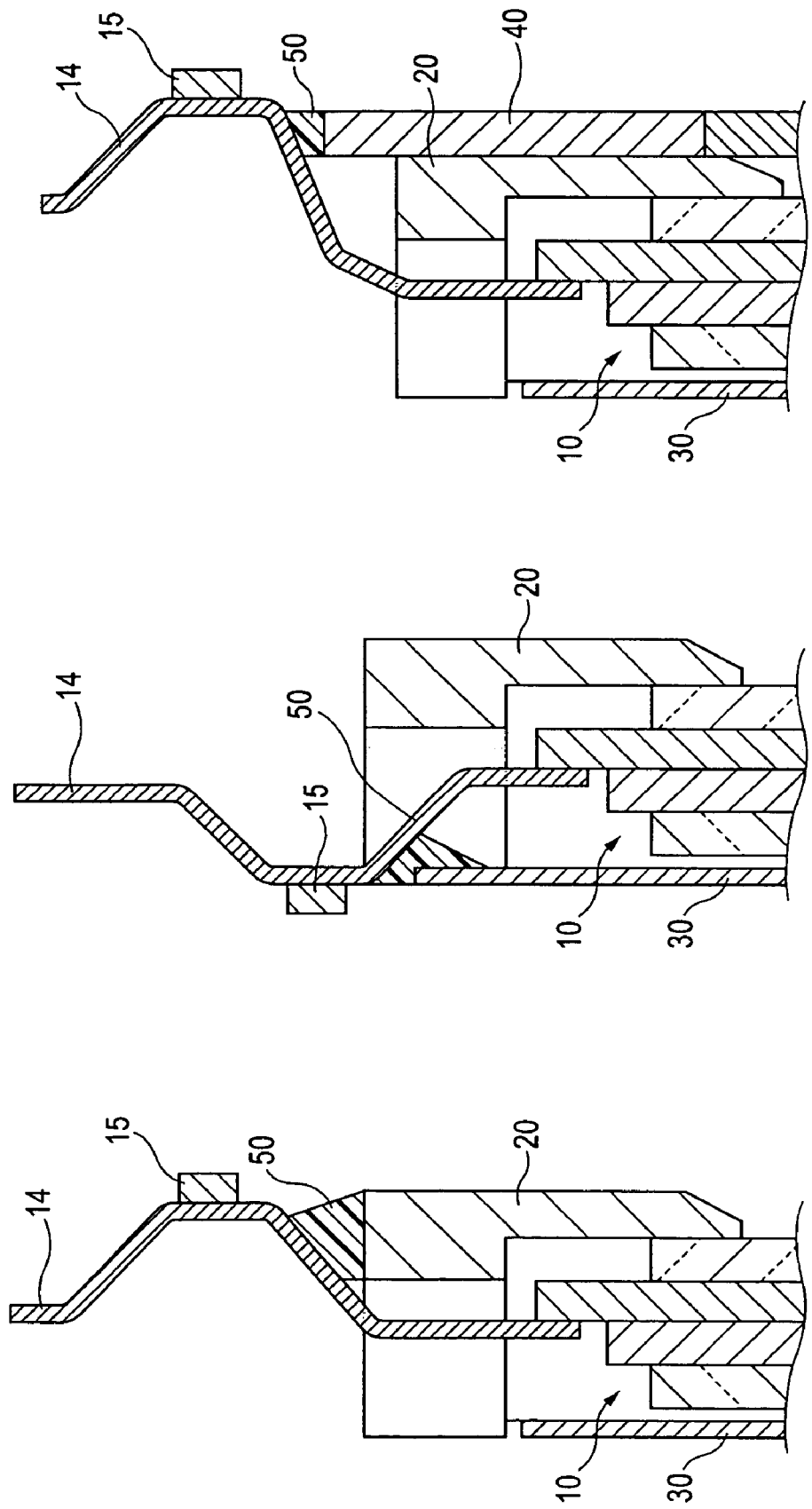
FIGS. 14A to 14C are partial sectional side views of other examples of the liquid crystal display according to the second embodiment.

Next, other examples of the liquid crystal displays of this embodiment will be described with reference to FIGS. 14A to 14C. FIGS. 14A to 14C are partial diagrams for explaining the other examples of the liquid crystal display of this embodiment.

As shown in the drawings, the driving IC 15 is not covered with the support, and the flexible film substrate 14 has bending points. With these structures, the driving IC 15 on the flexible film substrate 14 is offset in directions parallel to the direction of the light incident on the liquid crystal display panel 10. The offset amount is preferably at a level at which the driving IC 15 is distant from the outer edge of the support in the outward direction.

Here, the phrase "distant from the outer edge of the support in the outward direction" means that the component is at the incident light-side with respect to the end face of the support disposed at the incident light-side of the liquid crystal display or that the component is at the outgoing light-side with respect to the end face of the support disposed at the outgoing light-side of the liquid crystal display. To be more specific, the driving IC 15 may be at the outgoing light-side with respect to the frame 20, i.e., the support, as shown in FIG. 14A; the driving IC 15 may be at the incident light-side with respect to the light-shielding panel 30, i.e., the support, as shown in FIG. 14B; or the driving IC 15 may be at the outgoing light-side with respect to the mounting board 40, as shown in FIG. 14C.

The driving IC 15 at an offset position is located on the passage of air delivered by the blower fan of the LCD projector. Thus, the cooling air can be supplied to the driving IC 15 to thereby reliably cool the driving IC 15.

When the driving IC 15 is disposed at an offset position, it is preferable to fix the vicinity of the driving IC 15 onto the support. In particular, the portion near the driving IC 15 may be fixed onto the frame 20, as shown in FIG. 14A, onto the light-shielding panel 30, as shown in FIG. 14B, or onto the mounting board 40, as shown in FIG. 14C. The flexible film substrate 14 is typically a flexible film having a thickness of about 100 to about 200 μm. Thus, when cooling air is blown toward the driving IC 15 at an air velocity of about 5 to 7 m/s, the flexible film substrate 14 will vibrate, thereby increasing the risk of disconnection and increased noise. By fixing the portion of the flexible film substrate 14 near the driving IC 15, which is the largest component on the flexible film substrate 14, vibration of the flexible film substrate 14 resulting from blown air can be suppressed, and the risk of disconnection and increased noise can be avoided.

The flexible film substrate 14 may be fixed onto the support via the heat conductive resin 50. The heat conductive resin 50 may be, for example, an acrylic rubber- or ethylene-propylene-based heat conducting sheet (e.g., TM Sheet EP produced by F-CO Co., Ltd.) or an insulating resin material having a high heat conductivity (e.g., CN-733 produced by MERECO). Such a resin has both elasticity and heat conductivity.

By fixing the flexible film substrate 14 onto the support using the heat conductive resin 50, heat generated in the driving IC 15 is transmitted to the support via the flexible film substrate 14 and the heat conductive resin 50. Thus, the support, such as the frame 20, the light-shielding panel 30, and the mounting board 40, can be used to release heat, and the temperature increase in the driving IC 15 can be reliably suppressed. Moreover, the interposed heat conductive resin 50 is elastic and thus absorbs the difference in thermal strain between the two components having different linear expansion coefficients. Thus, the flexible film substrate 14 does not detach from the support.

Figure 15:
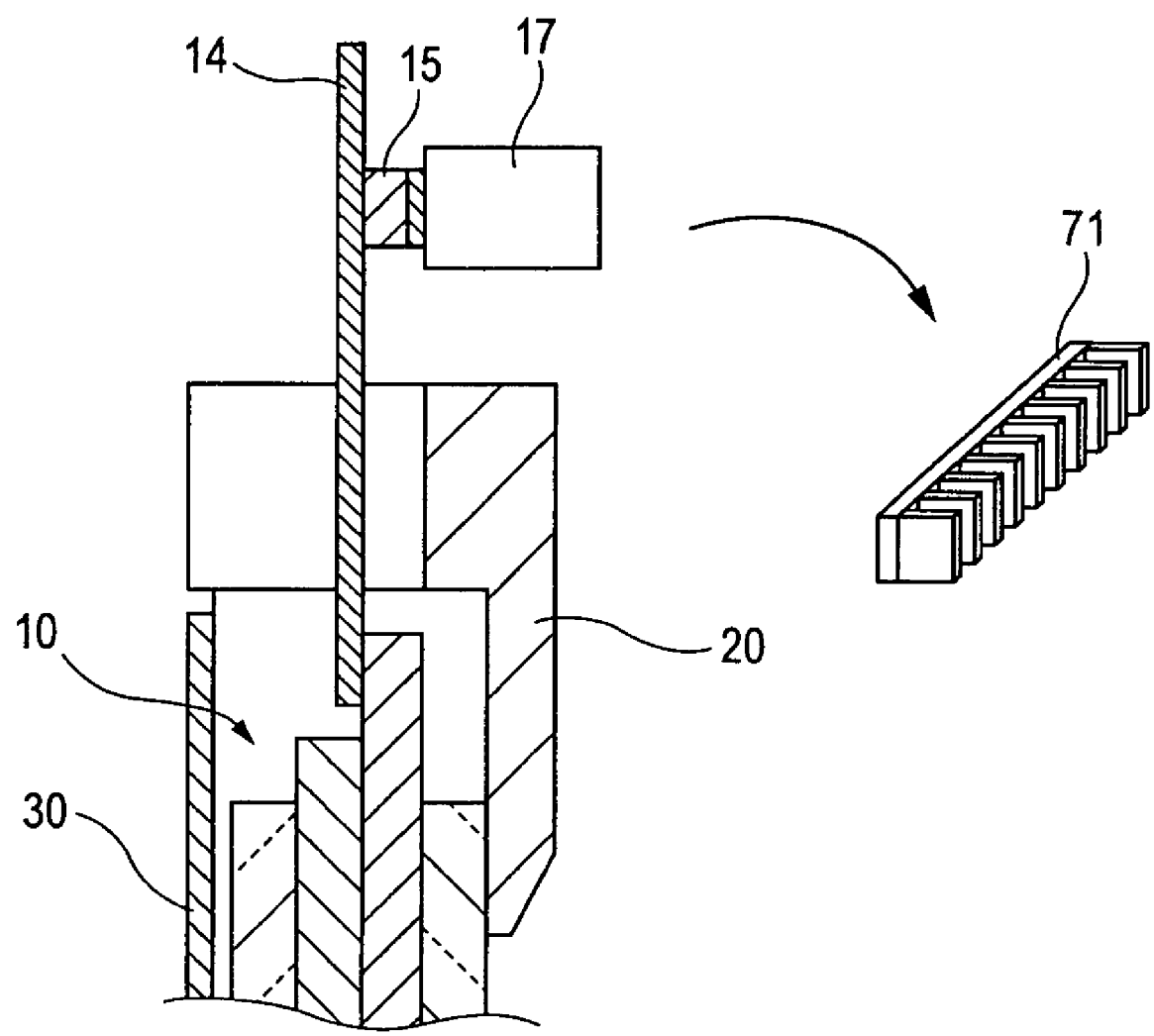
FIG. 15 is a partial sectional side view of an example of the liquid crystal display according to the second embodiment.

Another example of the liquid crystal display of this embodiment is described below with reference to FIG. 15. FIG. 15 is a partial diagram for explaining another example of the liquid crystal display.

As shown in FIG. 15, the driving IC 15 of this liquid crystal display is not covered with the support but is attached to a heat sink 71. The heat sink 71 is a device (radiator) for releasing the heat generated in the driving IC 15 to the exterior. The heat sink 71 is a metal component with many fins for increasing the surface area. The heat sink 71 may be attached onto the chip surface of the driving IC 15 via a heat conducting resin similar to the heat conductive resin 50. The heat conducting resin can absorb the difference in linear expansion coefficient between the driving IC 15 and the heat sink 71.

The heat sink 71 helps release the heat of the driving IC 15 with high efficiency, thereby securing further suppression of the temperature increase of the driving IC 15. The driving IC 15 may be provided with the heat sink 71 and at the same time disposed at an offset position, as described above. With this structure, the temperature increase of the driving IC 15 will be further suppressed.

Third Embodiment

Figure 16A:
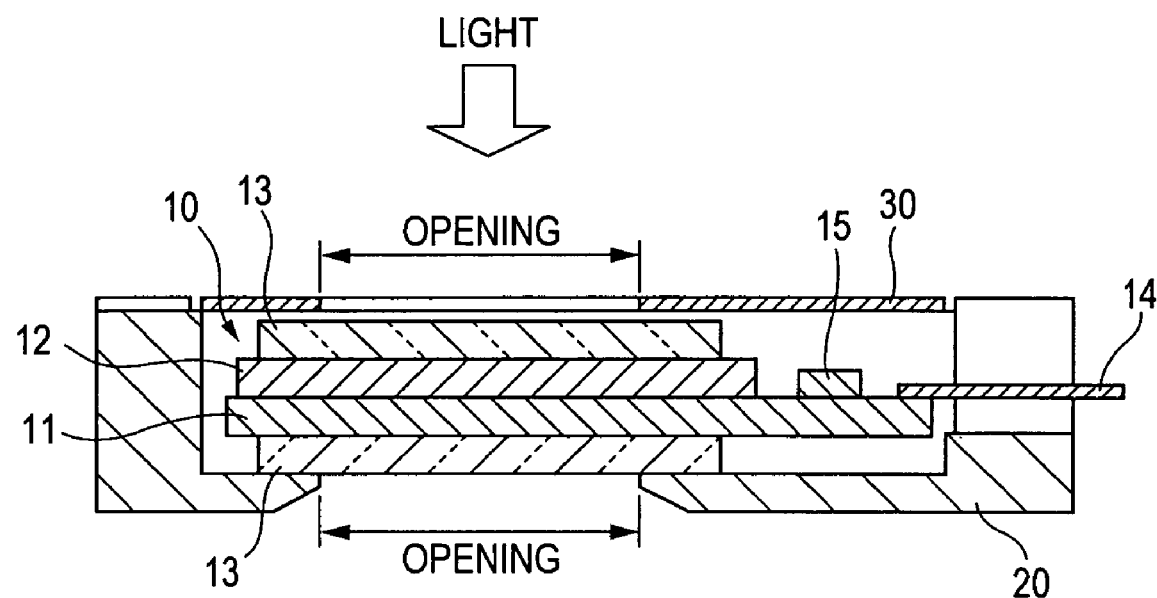
FIGS. 16A and 16B are cross-sectional views of examples of a liquid crystal display according to a third embodiment.
Figure 16B:
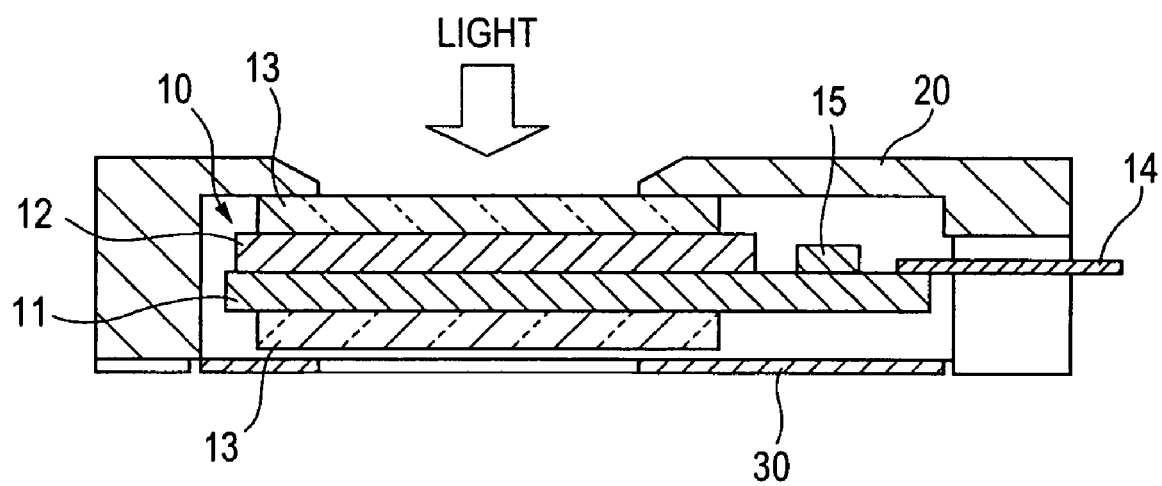

A liquid crystal display of a third embodiment will now be described with reference to FIGS. 16A and 16B. The liquid crystal display includes the liquid crystal display panel 10, the frame 20, and the light-shielding panel 30. The frame 20 is disposed at the outgoing light-side of the liquid crystal display panel 10 and functions as a support of the liquid crystal display panel 10. The frame 20 may be composed of a metal material, such as aluminum, magnesium, or stainless steel, having high heat conductivity, or a resin having high heat conductivity. The light-shielding panel 30 is disposed at the incident light-side of the liquid crystal display panel 10 and shields light entering the region outside the effective pixel region. The light-shielding panel 30 may be a metal or resin plate with high heat conductivity having an opening corresponding to the effective pixel region.

The detailed structure and the operation of the liquid crystal display panel 10 are the same as those of the first embodiment described above. Thus, the description therefor is omitted here to avoid redundancy.

The liquid crystal display of this embodiment also has a driving circuit outside the liquid crystal display panel 10. However, in this embodiment, the flexible film substrate 14 for receiving signals from a parent device (e.g., a controller of the LCD projector) and the driving IC 15 for driving the liquid crystal display panel 10 are disposed on the TFT substrate 11 of the liquid crystal display panel 10. The driving IC 15 is electrically connected to the respective electrodes of the TFT substrate 11 and the counter substrate 12 to thereby drive the liquid crystal display panel 10. Alternatively, the driving IC 15 may be mounted on the counter substrate 12 instead of the TFT substrate 11. In other words, the driving IC 15 may be mounted on any one of the substrates that constitute the liquid crystal display panel 10. The detailed description of the flexible film substrate 14 and the driving IC 15 are omitted here since it is already provided in the related art.

In this liquid crystal display, the driving IC 15 is separate from the liquid crystal display panel 10 but disposed on one of the substrates of the liquid crystal display panel 10. This structure is known as chip-on-glass (COG) structure. According to the COG structure, the effective pixel area in the liquid crystal display panel 10 can be increased and the number of the liquid crystal display panels 10 produced from a mother substrate can be easily increased since the driving IC 15 is provided separate from the liquid crystal display panel 10. Thus, higher precision, higher aperture ratios, and low cost can be realized. Since the driving IC 15 is disposed near on the TFT substrate 11, for example, i.e., near the respective electrodes, the responsiveness in driving the liquid crystal display panel 10 is increased, vibration of the driving IC 15 can be reduced, and a more stable operation becomes possible.

The feature of this liquid crystal display is the positional relationship between the driving IC 15 and the frame 20. In particular, as shown in FIGS. 16A and 16B, the driving IC 15 is covered with one component at the incident light-side selected from the frame 20 and the light-shielding panel 30 or more preferably covered with both the frame 20 and the light-shielding panel 30. In other words, one or, preferably, both of the frame 20 and the light-shielding panel 30 are extended beyond the driving IC 15.

With this structure, the light emitted from the light source 1 of the LCD projector is shielded by the frame 20 or the light-shielding panel 30 and does not directly enter the driving IC 15. Thus, the frame 20 and/or the light-shielding panel 30 functions as a shielding member for shielding light entering the driving IC 15.

Accordingly, a temperature increase of generation of carriers caused by light incident on the driving IC 15 can be prevented. Thus, a LCD projector equipped with this liquid crystal display having a COF structure can meet the demands for higher precision, higher aperture ratios, low costs, and the like, and rarely suffers from malfunction of the driving IC 15 resulting from the light incident on the driving IC 15. This structure prevents inappropriate optical modulation in the liquid crystal display panel 10 by the malfunction, i.e., the degradation in the quality of the image displayed. According to the liquid crystal display described herein, the reliability of the driving IC 15, i.e., the driving circuit of the liquid crystal display panel 10, can be improved along with the reliability of the liquid crystal display.

In particular, when both the frame 20 and the light-shielding panel 30 function as light-shielding components, not only light directly incident from the light source 1, but also the diffracted or reflected light, can be prevented from entering the driving IC 15. In this manner, the malfunction of the driving IC 15 resulting from incident light can be more securely prevented.

Moreover, no additional component is necessary since the frame 20 and the light-shielding panel 30 are used to shield light. Thus, the reliability can be improved without increasing the cost.

Figure 17A:
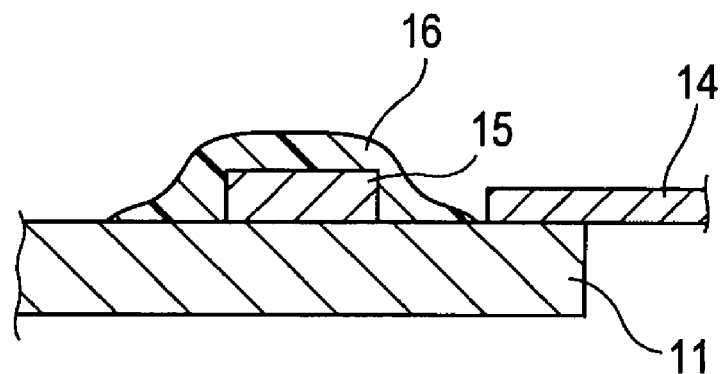
FIGS. 17A to 17C are cross-sectional views of examples of the liquid crystal display according to the third embodiment with partial modifications.
Figure 17B:
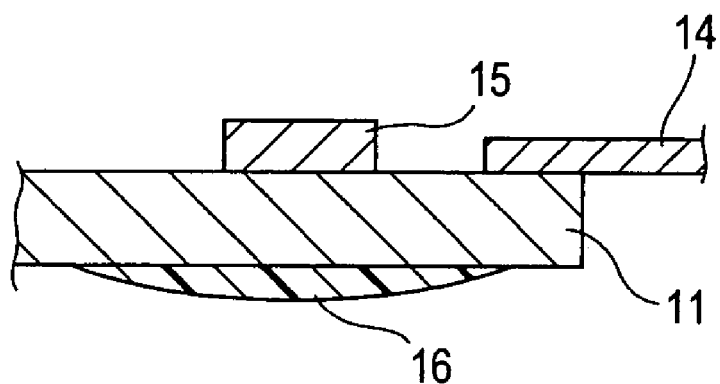
Figure 17C:
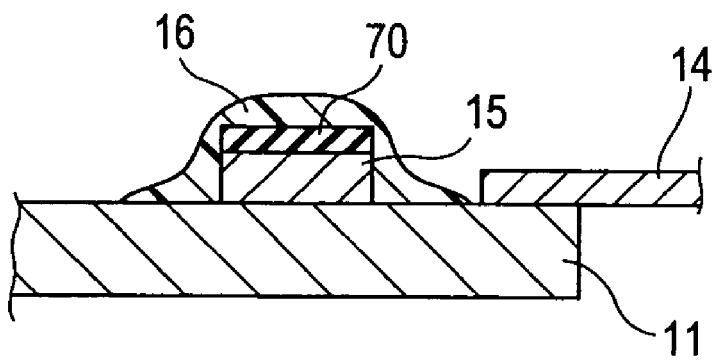
Figure 18A:
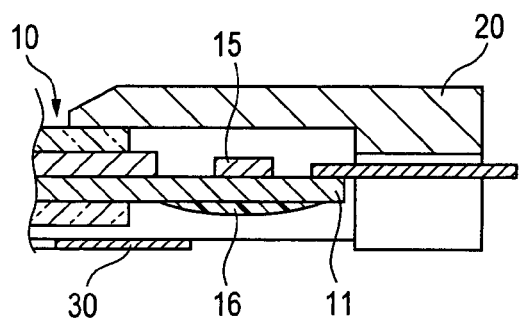
FIGS. 18A to 18F are partial sectional side views of examples of the liquid crystal display according to the third embodiment with partial modifications.
Figure 18B:
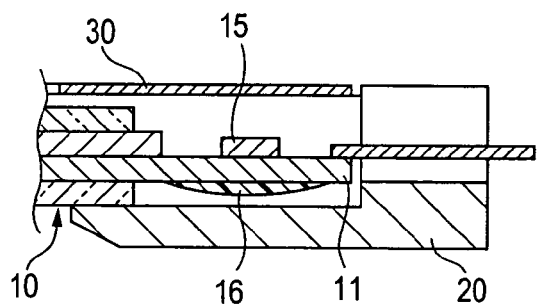
Figure 18C:
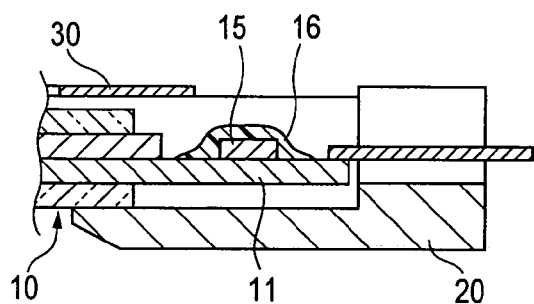
Figure 18D:
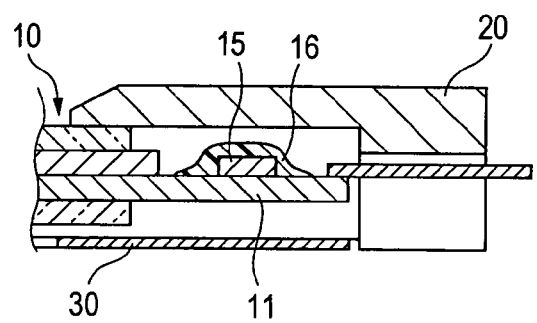
Figure 18E:
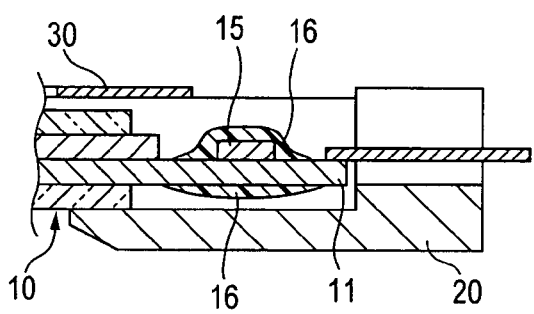
Figure 18F:
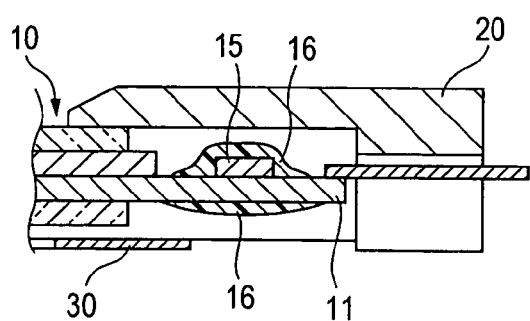

Alternatively, as shown in FIGS. 17A to 17C, it is possible to provide an additional resin component 16 at a position corresponding to the driving IC 15. The resin component 16 may be any component having a light-shielding property, an insulating property, and elasticity. Examples thereof include room temperature-vulcanizable (RTV) silicone rubbers. The resin component 16 may cover the driving IC 15, as shown in FIG. 17A, may be disposed at the back of the TFT substrate 11 remote from the driving IC 15, as shown in FIG. 17B, or may cover the driving IC 15 provided with an insulating film 70 ($SiO_2/SiN$, or the like) on its surface, as shown in FIG. 17C.

In order to shield light at both the incident light-side and the outgoing light-side, as shown in FIGS. 18A to 18F, the resin component 16 may be used in combination with one of the frame 20 and the light-shielding panel 30 or two resin components 16 may be respectively disposed on the two surfaces of the TFT substrate 11. With the resin component 16, light entering the driving IC 15 can be easily shielded without complicating the shape of the frame 20 or the light-shielding panel 30.

Other examples of the liquid crystal display of this embodiment will now be described. FIGS. 19A to 21B are cross-sectional views showing the other examples of the liquid crystal display of this embodiment.

Figure 19A:
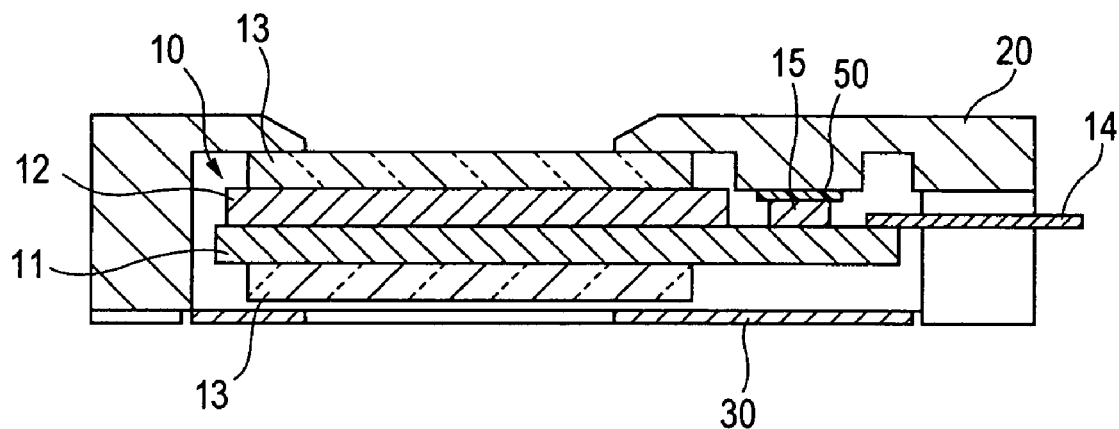
FIGS. 19A and 19B are sectional side views of examples of the liquid crystal display according to the third embodiment with partial modifications.
Figure 19B:
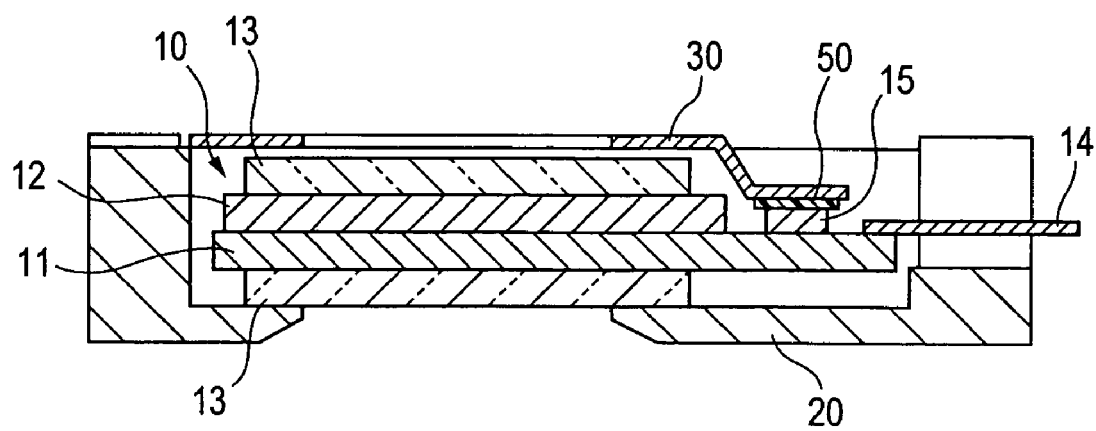
Figure 20A:
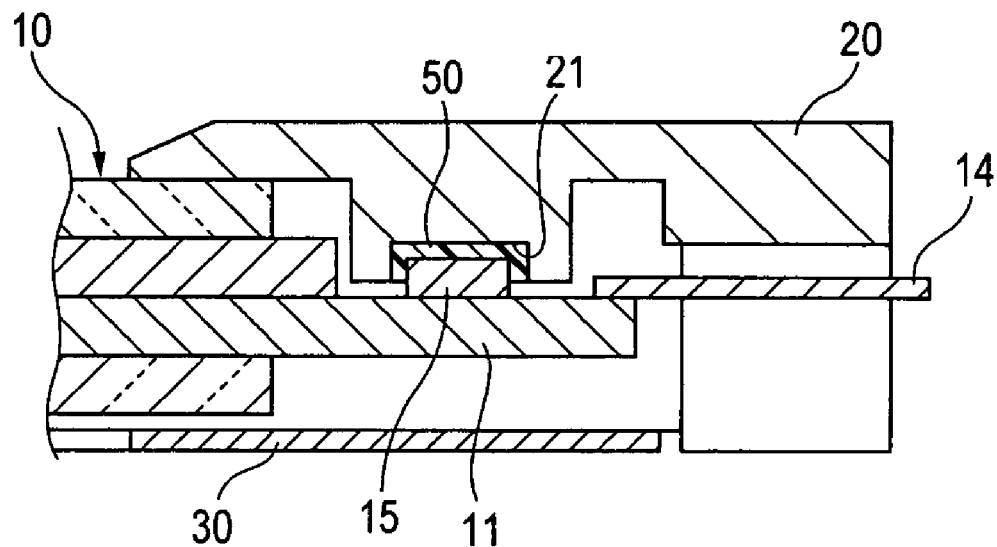
FIGS. 20A and 20B are sectional side views of examples of the liquid crystal display according to the third embodiment with partial modifications.
Figure 20B:
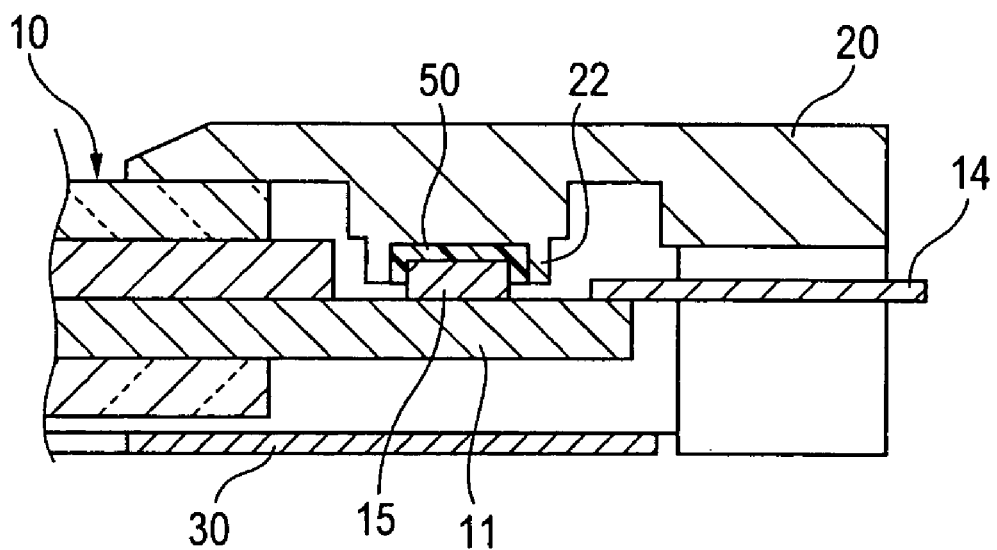
Figure 21A:
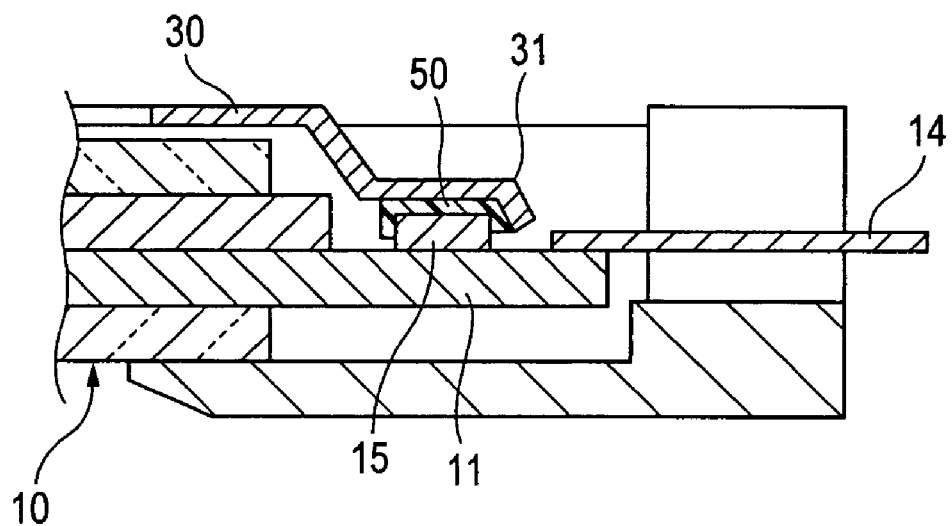
FIGS. 21A and 21B are sectional side views of examples of the liquid crystal display according to the third embodiment with partial modifications.
Figure 21B:
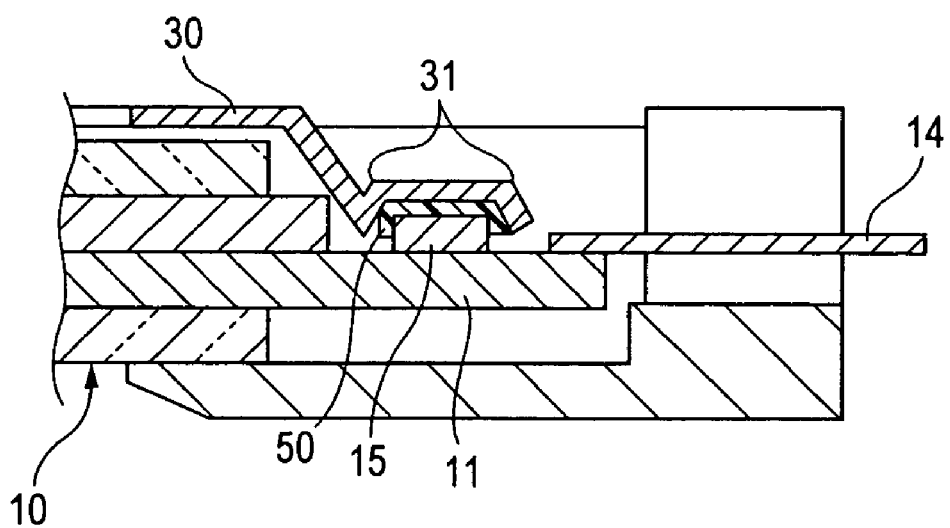

The light-shielding component of the liquid crystal display described here not only shields light entering the driving IC 15, but also releases heat generated in the driving IC 15 via the portion connected to the surface of the driving IC 15. As shown in FIGS. 19A and 19B, the driving IC 15 is connected to either the frame 20 (FIG. 19A) or the light-shielding panel 30 (FIG. 19B) that functions as the light-shielding component.

This structure allows the heat generated in the driving IC 15 to be transmitted to the frame 20 or the light-shielding panel 30, thereby releasing the heat from the driving IC 15. Accordingly, the temperature increase of the driving IC 15 can be suppressed, the light from the light source 1 can be adequately shielded, and the malfunction of the driving IC 15 can be securely prevented.

As shown in FIGS. 19A and 19B, the heat conductive resin 50 is preferably interposed between the driving IC 15 and the frame 20 or between the driving IC 15 and the light-shielding panel 30 to absorb the difference in linear expansion coefficient between the driving IC 15, the frame 20, and the light-shielding panel 30 and to thereby prevent detachment of the components. Examples of the heat conductive resin 50 are the same as those described in the second embodiment.

The frame 20 or the light-shielding panel 30 to which the driving IC 15 is to be connected preferably has a processed portion to increase the area attached to the surface of the driving IC 15, as shown in FIGS. 20A to 21B. Examples of the processed portion include a groove such as a groove 21 shown in FIG. 20A, a projection such as a projection 22 show in FIG. 20B, and bent portions such as bent portions 31 shown in FIGS. 21A and 21B. The processed portion is not limited to these and may be of any shape that increases the area of the connection (e.g., corrugated portion). The processed portion that increases the area of the connection can improve the efficiency of heat transmission and effectively suppresses the temperature increase of the driving IC 15.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display for use in a LCD projector for projecting an enlarged image and for optically modulating light emitted from a light source of the LCD projector, the liquid crystal display comprising:
 a liquid crystal display panel including a TFT substrate, a counter substrate, and liquid crystal interposed between the TFT substrate and the counter substrate;
 a flexible film substrate being electrically coupled to the liquid crystal display panel and having a plurality of leads including at least one dummy lead; and
 a driving IC for driving the liquid crystal display panel, the driving IC being disposed on the film substrate and having at least one dummy bump,
 wherein the dummy bump is connected to the dummy lead, and the dummy lead has a heat releasing function.

2. The liquid crystal display according to claim 1, wherein the dummy lead has an average line width larger than that of the other leads.

3. The liquid crystal display according to claim 1, wherein the plurality of leads of the flexible film substrate are formed on a base film, and the flexible film substrate is partially covered with a cover film so as to expose the dummy lead.

4. The liquid crystal display according to claim 1, further comprising a support for supporting the liquid crystal display panel and/or a light-shielding panel for shielding light entering a region other than an effective pixel region of the liquid crystal display panel, wherein the dummy lead is connected to the support or the light-shielding panel.

5. The liquid crystal display according to claim 4, wherein the dummy lead is connected to the support of the light-shielding panel via a heat conductive resin.

6. A liquid crystal display for use in a LCD projector for projecting an enlarged image and for optically modulating light emitted from a light source of the LCD projector, the liquid crystal display comprising:

a liquid crystal display panel including a TFT substrate, a counter substrate, and liquid crystal interposed between the TFT substrate and the counter substrate;

a support including a frame for supporting the liquid crystal display panel;

a flexible film substrate being electrically coupled to the liquid crystal display panel and having a plurality of leads including at least one dummy lead; and a driving IC for driving the liquid crystal display panel, the driving IC being disposed on the film substrate and having at least one dummy bump, wherein the dummy bump is connected to the dummy lead, and the dummy lead has a heat releasing function, and wherein the driving IC is disposed on the flexible film substrate, and the position of the driving IC is distant from an outer edge of the support in an outward direction.

7. The liquid crystal display according to claim 6, wherein the flexible film substrate has a bending point for offsetting the position of the driving IC so that the driving IC is on the passage of air sent by a blower fan of the LCD projector.

8. The liquid crystal display according to claim 7, wherein a portion of the flexible film substrate near the driving IC is fixed onto the support.

9. The liquid crystal display according to claim 8, wherein the portion of the flexible film substrate near the driving IC is fixed onto the support using a heat conductive resin.

10. The liquid crystal display according to claim 6, further comprising a heat sink attached to the driving IC.

* * * * *